(12) United States Patent
Kita et al.

(10) Patent No.: US 7,130,713 B2
(45) Date of Patent: Oct. 31, 2006

(54) USED WIRE CUTTING DEVICE FOR WIRE CUT ELECTRIC DISCHARGE MACHINE

(75) Inventors: Yuki Kita, Yamanashi (JP); Yushi Takayama, Yamanashi (JP); Yoshinori Makino, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/136,411

(22) Filed: May 25, 2005

(65) Prior Publication Data

US 2005/0267624 A1     Dec. 1, 2005

(30) Foreign Application Priority Data

May 25, 2004     (JP)     ............................. 2004/154533

(51) Int. Cl.
   *G06F 19/00*     (2006.01)
(52) U.S. Cl. ...................................................... 700/162
(58) Field of Classification Search ................. 700/162
   See application file for complete search history.

(56) References Cited

U.S. PATENT DOCUMENTS

| 3,626,457 | A | * | 12/1971 | Duerr et al. | ................... | 83/74 |
| 2003/0205121 | A1 | * | 11/2003 | Florian et al. | ................ | 83/349 |

FOREIGN PATENT DOCUMENTS

| EP | 0 417 289 | 5/1990 |
| EP | 0 509 817 | 10/1992 |
| EP | 1 027 954 | 8/2000 |
| JP | 60238257 | 11/1985 |
| JP | 63288617 | 11/1988 |
| JP | 02292108 | 12/1990 |
| JP | 03-049831 | 3/1991 |
| JP | 03251332 | 11/1991 |
| JP | 05-301121 | 11/1993 |
| JP | 05301121 | 11/1993 |
| JP | 2003-340684 | 12/2003 |

OTHER PUBLICATIONS

EP Search Report for corresponding application EP 05253193.6-2206 dated Oct. 18, 2005.

* cited by examiner

*Primary Examiner*—Albert W. Paladini
*Assistant Examiner*—R A Jarrett
(74) *Attorney, Agent, or Firm*—Staas & Halsey LLP (57) ABSTRACT

A used wire cutting device for wire cut electric discharge machine which appropriately determines the time to replace a movable blade and a fixed blade of a cutting mechanism on the basis of not only time but also the degree of wear of each blade. The device includes a wear rate storage means for storing the wear rate per cut (1/P) of a blade of the wire cutting device depending on the diameter and material of the wire. The number of cuts performed during machining is obtained from the length of time from the start to the end of machining, and the number of actions of cutting per unit time. The number of cuts obtained is multiplied by the wear rate (1/P) for the wire used, and the resultant value is added to the last value of total wear rate R. With the value thus obtained, the last value of the total wear rate R is replaced. When the current value of the total wear rate R exceeds a predetermined wear rate, a message recommending blade (chip) replacement is sent out, and when the chip is replaced, the total wear rate R is reset to 0. Also when an alarm indicating wire cut failure is sent out, the chip is replaced and the total wear rate R is reset to 0. Further, the device is so arranged to be able to replace the wear rate (1/P) stored on the basis of data obtained by actual cutting.

15 Claims, 7 Drawing Sheets

TURN TO CHANGE POSITION 31
25
24

FIG.4b

REFERENCE SURFACE 25
31
24

| WIRE DIAMETER \ WIRE MATERIAL | A | B | C |
|---|---|---|---|
| φ0.1 | $P_{11}$ | $P_{12}$ | $P_{13}$ |
| φ0.15 | $P_{21}$ | $P_{22}$ | $P_{23}$ |
| φ0.2 | $P_{31}$ | $P_{32}$ | $P_{33}$ |
| φ0.25 | $P_{41}$ | $P_{42}$ | $P_{43}$ |
| φ0.3 | $P_{51}$ | $P_{52}$ | $P_{53}$ |

USED WIRE CUTTING DEVICE FOR WIRE CUT ELECTRIC DISCHARGE MACHINE

BACKGROUND OF THE INVENTION

1. Field of the Invention

The present invention relates to a used wire cutting device for a wire cut electric discharge machine, which cuts a used wire electrode into pieces by a mechanically or magnetically moved blade and drops them into a container.

2. Description of Related Art

It is already known to provide a wire cutting device for cutting a used wire electrode into pieces by a mechanically or magnetically moved blade and dropping them into a container, on a discharge side of a wire cut electric discharge machine (see JP3-49831A or JP2982485B, for example).

Normally, when used wires are cut by a movable blade and a fixed blade, the blades become worn out and unable to cut wires in a certain time. Generally, the time to replace a blade is determined on the basis of the time for which it has been used. However, the degree of wear of a blade varies depending on the diameter and material of a wire used. Further, even if wires used are the same in diameter and material and blades used are the same in material, the life of the blades varies depending on makers. Hence, it is difficult to determine the time to replace a blade only on the basis of time.

The technique for estimating the life of a blade is known in JP2003-340684A, although it is not for a wire cutting device for wire cut electric discharge machine but for a saw blade. The technique disclosed in JP2003-340684A is intended to deal with various materials, shapes and sizes, and determines the life of a blade on the basis of many elements. Hence, the relation between the area of cut and the amount of wear is shown by a polygonal curve. Further, the amount of wear that corresponds to the life varies depending on the material and diameter. Thus, many elements are considered to determine the life.

There exists no technique of determining the time to replace a blade of a wire cutting device provided in a wire cut electric discharge machine to cut a used wire electrode into pieces and drop them into a container. By the technique of estimating the life of a saw blade disclosed in JP2003-340684A, it is difficult to determine the life or correct the life determined, since the life is determined on the basis of many elements.

SUMMARY OF THE INVENTION

A used wire cutting device of the present invention appropriately determines the time to replace a movable blade and a fixed blade of a cutting mechanism based on not only time but also a degree of wear of each blade.

The used wire cutting device repeatedly cuts a used wire by a blade in a wire-cut electric discharge machine, and comprises: wear rate storage means storing information on a predetermined wear rate of the blade per cut of the wire; counting means for counting the number of cuts of the wire by the blade; and blade replace time determining means for determining time to replace the blade based on the wear rate of the blade per cut of the wire and the number of cuts of the wire by the blade to output a signal indicative of the time to replace the blade.

The wear rate storage means may store information on predetermined wear rates of the blade per cut of wires having different diameters and/or different materials.

The wear rate storage means may store the number of cuts performable by the blade in a life thereof, based on which the predetermined wear rate of the blade per cut of the wire is obtained.

The counting means may count the number of cuts of the wire by the blade based on the number of actions of the blade per unit time and a time period in which the blade is in operation.

The blade replace time determining means may obtain a total wear rate of the blade based on the predetermined wear rate of the blade per cut of the wire and the number of cuts of the wire by the blade, and determine that it is time to replace the blade when the obtained total wear rate is equal to or greater than a predetermined value.

The blade replace time determining means may include means for estimating the number of cuts of the wire by the blade during an electric discharge machining based on a machining program before starting the electric discharge machining, means for estimating an accumulative wear rate of the blade based on the predetermined wear rate of the blade per cut and the estimated number of cuts, and means for estimating a total wear rate after the electric discharge machining by adding the estimated accumulative wear rate to a total wear rate of the blade before the electric discharge machining, and means for determining whether or not the time to replace the blade comes before finishing the electric discharge machining based on the estimated total wear rate after the electric discharge machining.

The used wire cutting device may further comprise correcting means for correcting the information on the predetermined wear rate of the blade per cut of the wire stored in the wear rate storage means based on the counted number of cuts of the wire when the blade is replaced.

The used wire cutting device may further comprise correcting means for correcting the information on the predetermined wear rate of the blade per cut of the wire stored in the wear rate storage means based on a total wear rate of the blade when the blade is replaced. In this case, the predetermined wear rate of the blade per cut of the wire may be corrected in accordance with a ratio between the total wear rate of the blade when the blade is replaced and the predetermined wear rate.

Further, the predetermined wear rates of the blade per cut of wires of diameters and materials which the blade cut may be corrected in accordance with a ratio between the total wear rate of the blade when the blade is replaced and the predetermined wear rates.

The predetermined wear rates of the blade per cut of wires of materials which the blade cut before changing the blade may be corrected in accordance with a ratio of the total wear rate of the blade when the blade is replaced and the predetermined wear rates.

The blade may include a movable blade using a throwaway chip and a stationary blade. Alternatively, the blade may include a movable blade and a stationary blade each having at least two portions usable by changing a position thereof.

In the present invention, the time to replace a movable blade and a cutting blade is determined considering not only time but also the degree of wear of the blades that varies depending on the diameter and material of wire. Hence, the time for replacement can be determined appropriately. Since, in advance of starting machining, an estimated value for the total wear rate at the end of the machining is obtained from machining conditions to estimate the time to replace the blades, trouble such that a used wire is not cut during machining can be avoided. When the time for replacement recognized while cutting is actually performed is different from the time for replacement estimated (for example, the life of a blade expires before the time estimated, or the blade proves to be still functional when used beyond the time estimated), the reliability of the time for replacement estimated can be improved by correcting the number of cuts per life stored. By using, for the movable blade, a throwaway chip for general application, replacement or rearrangement can be performed easily at low costs. The movable blade and the fixed blade are so arranged that at least two parts of each can be selectively put in use by changing the position thereof.

DETAILED DESCRIPTION

Figure 1:
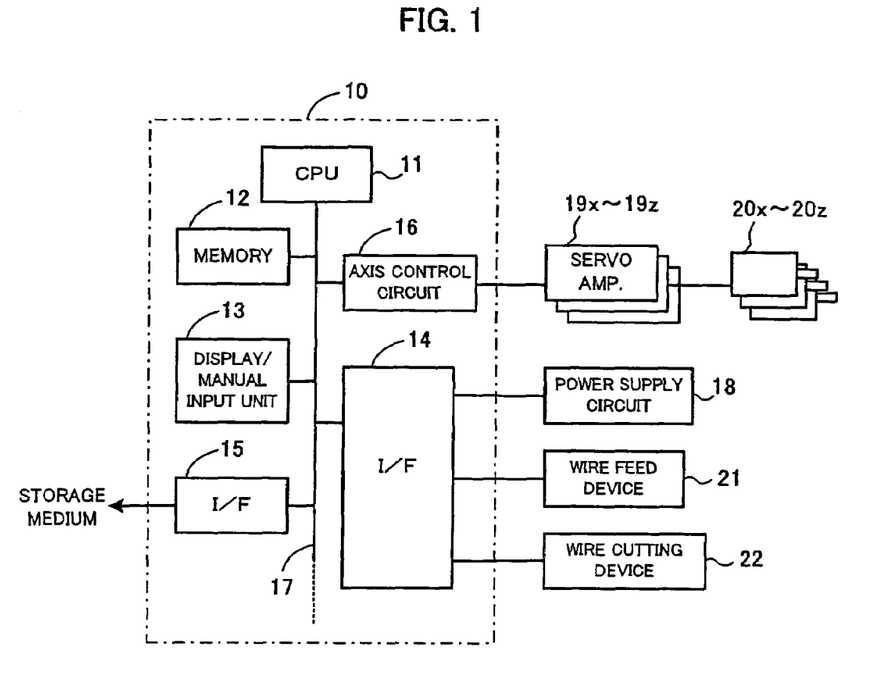
FIG. 1 is a schematic block diagram showing an embodiment of the present invention.

FIG. 1 is a schematic block diagram showing an embodiment of the present invention. FIG. 1 shows only parts relevant to the present invention. A control device 10 for a wire electric discharge machine comprises a processor (CPU) 11, a memory 12 formed from ROM, RAM and the like, a display/manual input unit 13 including a display using liquid crystals, CRTs or the like and an input device such as a keyboard or a control panel, input/output interfaces 14, 15, and an axis control circuit 16 for feed axes X, Y, Z of the wire electric discharge machine. The parts 12 to 16 are connected to the processor 11 through a bus 17.

To the axis control circuit 16, servo-amplifiers 19x, 19y, 19z for each of the axes are connected, and servomotors 20x, 20y, 20z for driving each of the feed axes are connected to the servo-amplifiers 19x, 19y, 19z, respectively. Although not shown, a detector for detecting position and speed is attached to each of the servomotors 20x to 20z. The position and speed detected is fed back to the axis control circuit 16, and the axis control circuit 16 feedback-controls the position and speed of each of the feed axes and drives the servomotors 20x to 20z through the servo-amplifiers 19x to 19z. For example, the servomotors for the X and Y axes drive a table with a workpiece fixed on in the X-axis and Y-axis directions, and the servomotor for the Z axis drives an upper wire guide in the Z-axis direction (perpendicular to the X and Y axes). The memory 12 includes a current-position register so that the position of each axis can be detected from the value of the current-position register on the basis of a position feedback signal from each detector. Although the wire electric discharge machine can have U and V axes for moving the upper wire guide on the X-Y plane in directions perpendicular to each other for taper machining, the U and V axes are omitted in the present embodiment.

To the interface 14, a power supply circuit 18 for applying a machining voltage across a wire electrode and a workpiece, a wire feed device 21 for feeding a wire electrode and a wire cutting device 22 for cutting a used wire electrode are connected. On an action instruction supplied from the processor 11, the wire feed device 21 feeds a wire at a predetermined wire feed speed, and the wire cutting device 22 cuts the used wire at predetermined intervals (in the case of a rotary blade, at a predetermined rotational speed). To a container for holding resultant cut wires, a sensor for detecting the potential of the container is attached. If the wire is not cut but continues like a series of beads and touches the container at one end, the voltage given to the wire is also given to the container, so that the potential of the container increases. In this case, an alarm indicating wire cut failure is sent out.

To the interface 15, a storage medium (memory card, for example) storing machining programs and others is connected. Machining programs read from the storage medium as needed enter the memory of the control device 10. The processor 11 on/off-controls the machining voltage applied by the power supply circuit 18 through the interface 14. The structure described so far is the same as that of a control device or the like of a conventional wire electric discharge machine. In this embodiment, the control device 10 of the wire electric discharge machine functions also as a control device for the wire cutting device 22.

Figure 2:
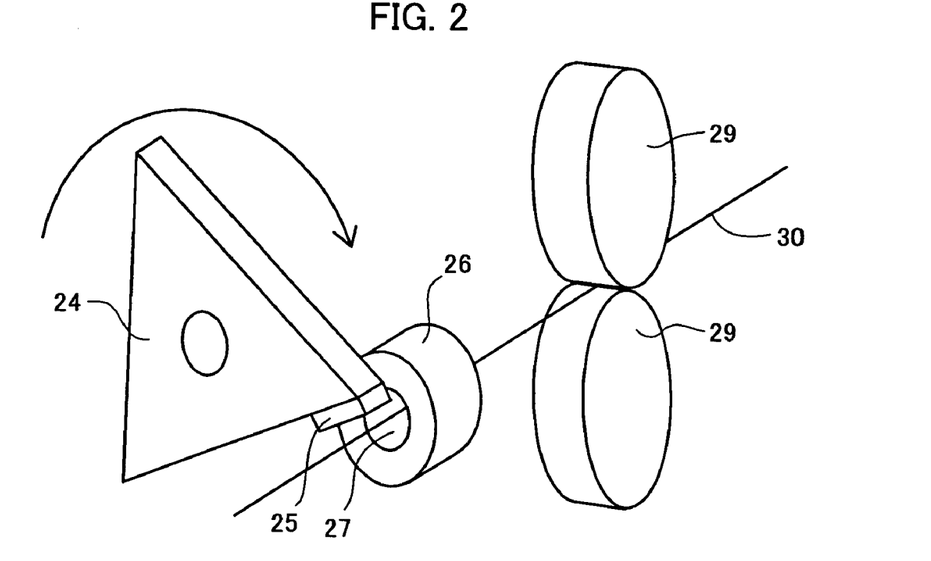
FIG. 2 is a perspective view schematically showing a wire electrode cutting mechanism of a wire cutting device.
Figure 3:
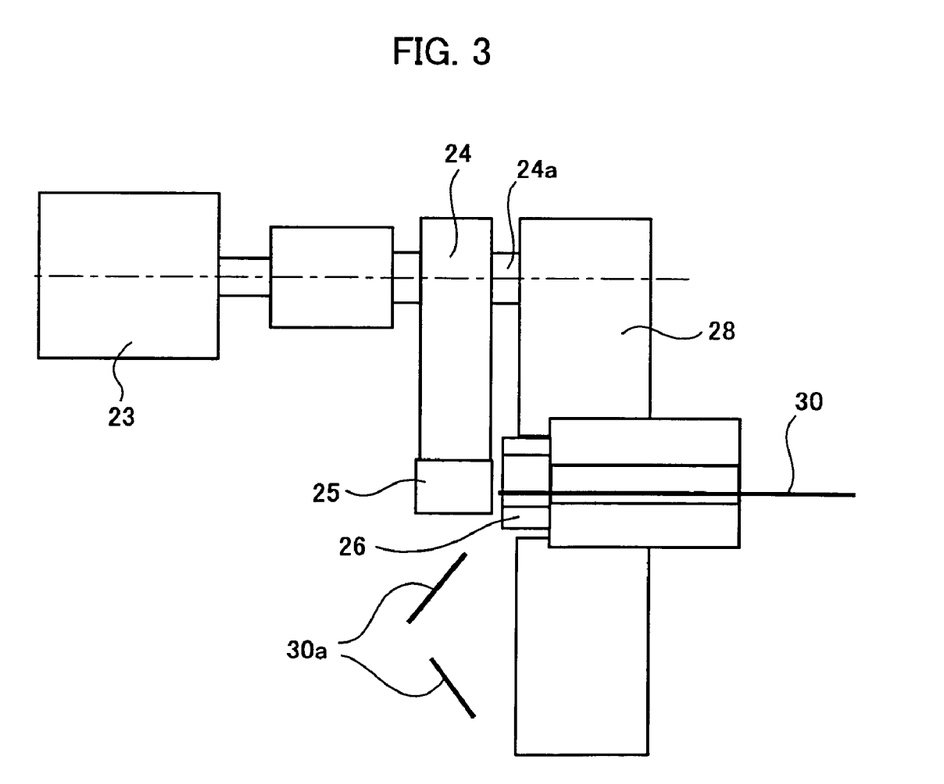
FIG. 3 is a plan view schematically showing a wire electrode cutting mechanism of a wire cutting device.

FIG. 2 is a perspective view schematically showing a wire electrode cutting mechanism of the wire cutting device 22, and FIG. 3 is a plan view schematically showing the wire electrode cutting mechanism of the wire cutting device 22. The wire electrode cutting mechanism comprises a rotary blade (movable blade) 25 attached at an end of a rotary cutter 24 driven by a motor 23 to rotate, and a fixed blade 26 arranged at a cutting position. For the rotary blade 25, a throwaway chip for general application (hereinafter referred to simply as "chip") is used. The fixed blade 26 is cylindrical in shape, and the edge of a circular hole 27 forms a blade in the exact meaning. Reference sign 28 denotes a base for supporting a shaft 24a of the rotary cutter 24 rotatably and fixing the fixed blade 26 at the cutting position. As shown in FIGS. 2 and 3, a used wire electrode 30 held between feed rollers 29 is passed through the hole 27 in the fixed blade 26 and fed out of an outlet of the hole 27 to a discharge side at a predetermined wire feed speed. Each time the length from the outlet of the hole 27 reaches a predetermined length, the wire is cut at the cutting position (position close to the outlet of the hole) by the rotary blade 25 of the rotary cutter 24, and the resultant piece 30a drops into a container not shown.

Figure 4A:
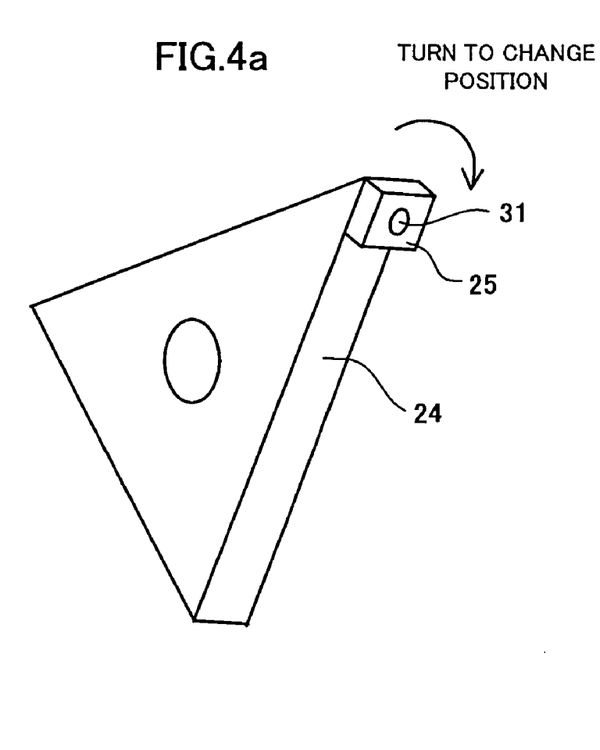
FIGS. 4a and 4b are diagrams showing replacement (rearrangement) of a rotary blade.
Figure 4B:
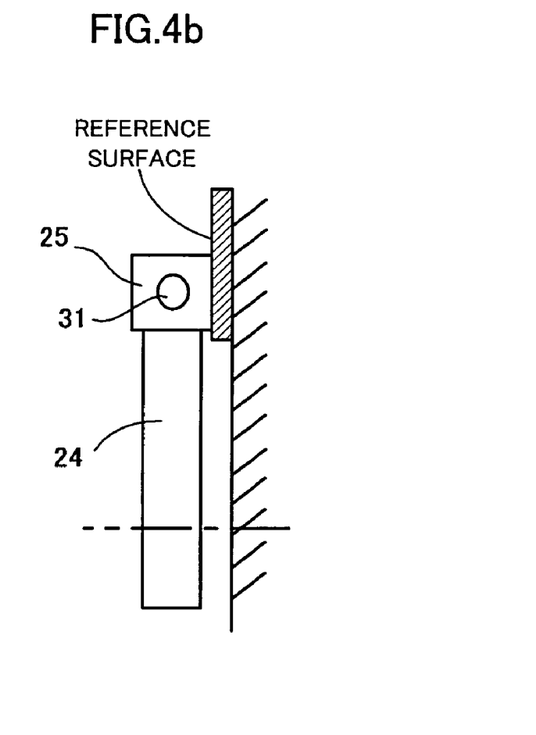
Figure 5:
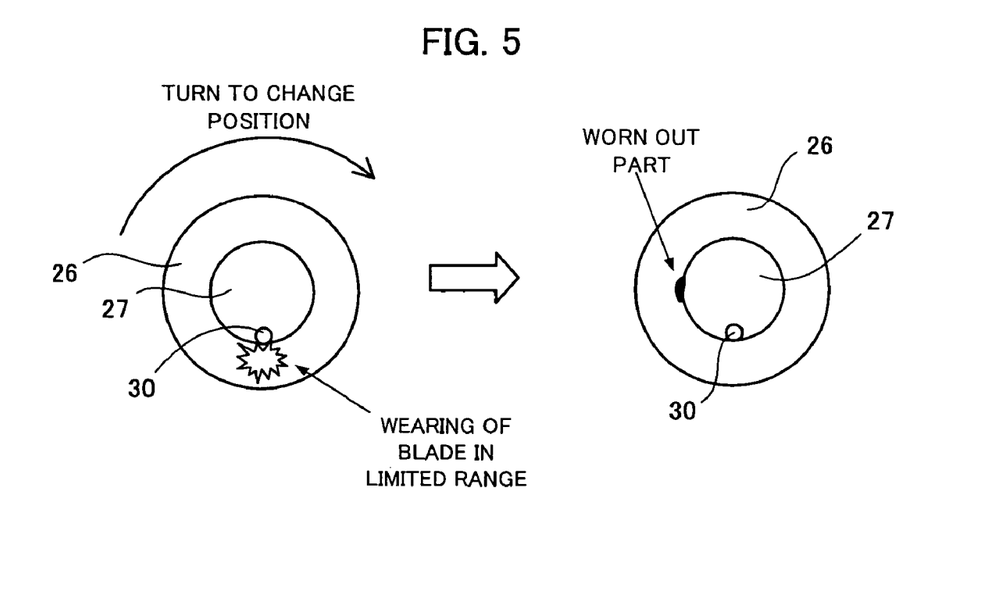
FIG. 5 is a diagram showing replacement (rearrangement) of a fixed blade.

FIGS. 4a and 4b shows replacement (rearrangement) of the rotary blade. For the rotary blade 25, a commercially available throwaway chip is used. When one side of the chip is worn out, the chip is not changed but the position of the chip is changed by loosening a fastening bolt 31 and turning the chip to replace the blade with an new blade (another side of the chip) [see FIG. 4a]. When the position of the chip is changed to replace the blade with a new blade or the chip itself is replaced with a new chip, the chip is placed in position by pressing it against a reference surface [see FIG. 4b] and fixed to the rotary cutter 24 by fastening the bolt. FIG. 5 shows replacement (rearrangement) of the fixed blade. When a certain part of the fixed blade 26 is worn out, the position of the fixed blade is changed by turning it to place a new part in position.

Next, a wear rate storage means, a cut counting means and a replacement time determining means provided in the used wire cutting device according to the present invention will be described.

1-1: Wear Rate Storage Means

Figure 6:
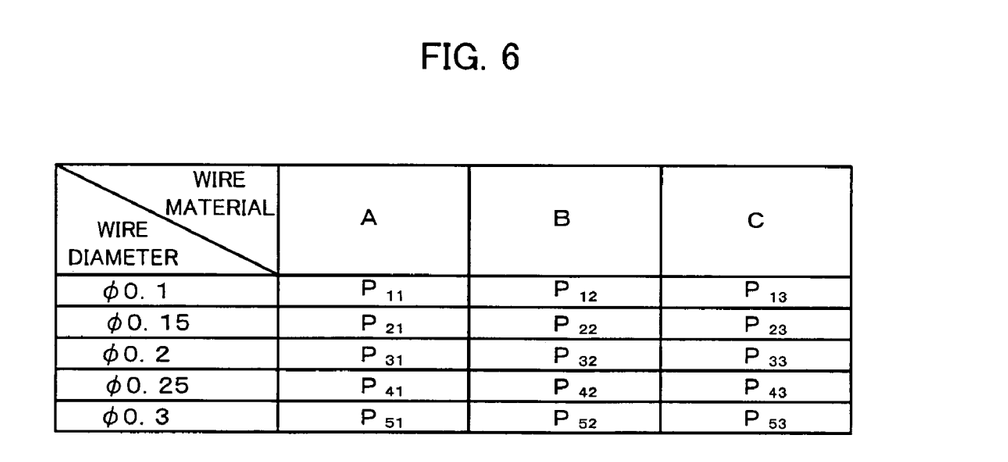
FIG. 6 shows, in the form of a table, wear rates for diameters and materials for wire, stored in a wear rate storing file as a wear rate storage means.

FIG. 6 shows an embodiment of the wear rate storage means stored in the memory 12. Specifically, it shows, in the form of a table, wear rates for diameters and materials of wires, stored in a wear rate storing file as the wear rate storage means. In FIG. 6, wire diameters are shown in the leftmost column and wire materials A, B, C are shown in the top row. Although the most common wire material is brass, there are wires made of tungsten or titan. P11 to P53 each represent how many cuts (actions of cutting) the blade can perform on a wire of a certain diameter and a certain material before the life of the blade expires (hereinafter referred to as "number of cuts per life"). The inverse of the number of cuts per life (1/number of cuts per life) shown in FIG. 6 indicates a wear rate per cut of the blade (hereinafter referred to as "wear rate"). The values P11 to P53 are obtained by experiment. Strictly, the same material of wire means the material identical in composition. However, here, materials different in composition but producing similar wear rates may be considered as the same material.

1-2: Cut Counting Means

There are some ways of obtaining the number of cuts (actions of cutting) performed by the blade, as shown below:

(1) Counting actions of the blade by means of a limit switch, a proximity switch or the like.

(2) In the case of a rotary blade, counting rotations of the rotary blade by means of an encoder or the like.

(3) Not using an encoder or the like but calculating: set value for number of blade actions per unit time (in the case of a rotary blade, set value for rotational speed)×time for which the blade is in operation.

1-3: Determining the Time to Replace the Blade

The ways of determining the time to replace the blade are summarized as below:

(1) Determining that it is time to replace the blade, when the number of cuts performed by the blade is equal to or greater than the number of cuts per life.

(2) Adding a wear rate of the blade based on the predetermined wear rate of the blade per cut and the number of cuts performed by the blade to obtain the sum of wear rates (hereinafter referred to as "accumulated wear rate"), and when the total wear rate, which means the sum of accumulated wear rates, is equal to or greater than a predetermined value for wear rate (hereinafter referred to as "predetermined wear rate"; normally, 1), determining that it is time to replace the blade.

When it is determined that it is time to replace the blade, a message is displayed on the display screen. In machining, the diameter and material of a wire in use are set as machining conditions. On the basis of the diameter and material of the wire thus set, the number of cuts per life is read from the wear rate storage means shown in FIG. 6, and used in calculating the total wear rate.

1-3-1: When One Type of Wire (of the Same Diameter and the Same Material) is Used before the Life of the Blade Expires

EXAMPLE 1-3-1

When Only a Wire of φ 0.3 and Material A is Used

Way 1: When number of cuts≧P51, it is determined that it is time to replace the blade.

Way 2: When number of cuts×wear rate (1/P51)≧predetermined wear rate, it is determined that it is time to replace the blade.

1-3-2: When Two or More Types of Wires are Used Before the Life of the Blade Expires

EXAMPLE 1-3-2

When a Wire of φ 0.3 and Material A, a Wire of φ 0.2 and Material B, and a Wire of φ 0.15 and Material C are Used For each type of wire, wear rate×number of cuts is obtained. When the sum of the resultant values is equal to or greater than the predetermined wear rate, it is determined that it is time to replace the blade. Specifically, when the number of cuts performed on the wire of φ 0.3 and material A×(1/P51)+the number of cuts performed on the wire of φ 0.2 and material B×(1/P32)+the number of cuts performed on the wire of φ 0.15 and material C×(1/P23)≧predetermined wear rate, it is determined that it is time to replace the blade. This way is applicable when one type of wire is used.

1-3-3: Estimating the Time to Replace the Blade in Advance of Starting Machining In advance of electric discharge machining, it is possible to estimate the time taken for machining, and obtain the number of cuts performed by the blade during machining by calculating: set value for number of blade actions per unit time (in the case of a rotary blade, set value for rotational speed)×time taken for machining. Then, on the basis of the diameter and material of the wire set as machining conditions, the number of cuts per life is read from the wear rate storage means shown in FIG. 6, and the total wear rate at the end of machining is calculated from total wear rate at the end of machining=total wear rate before starting machining+number of cuts×(1/number of cuts per life).

When the total wear rate at the end of machining is equal to or greater than the predetermined wear rate, it means that the time to replace the blade will come during machining. Hence, in advance of starting electric machining, an indication that the time to replace the blade will come is displayed to recommend replacing the blade. By this, trouble such that a used wire is not cut during machining can be avoided.

Next, the process of determining the time to replace the blade in a first embodiment will be described. In the first embodiment, the cut counting means obtains the number of cuts by calculating "set value for number of blade actions per unit time×time for which the blade is in operation" as set forth in (3) in the section headed "1-2 Cut counting means" (here, the time for which the blade is in operation is considered equal to the time of machining (time taken for machining)), and the time to replace the blade is determined depending on whether or not "the total wear rate is equal to or greater than the predetermined wear rate" as set forth in (2) in the section headed "1-3 Determining the time to replace the blade".

Figure 7:
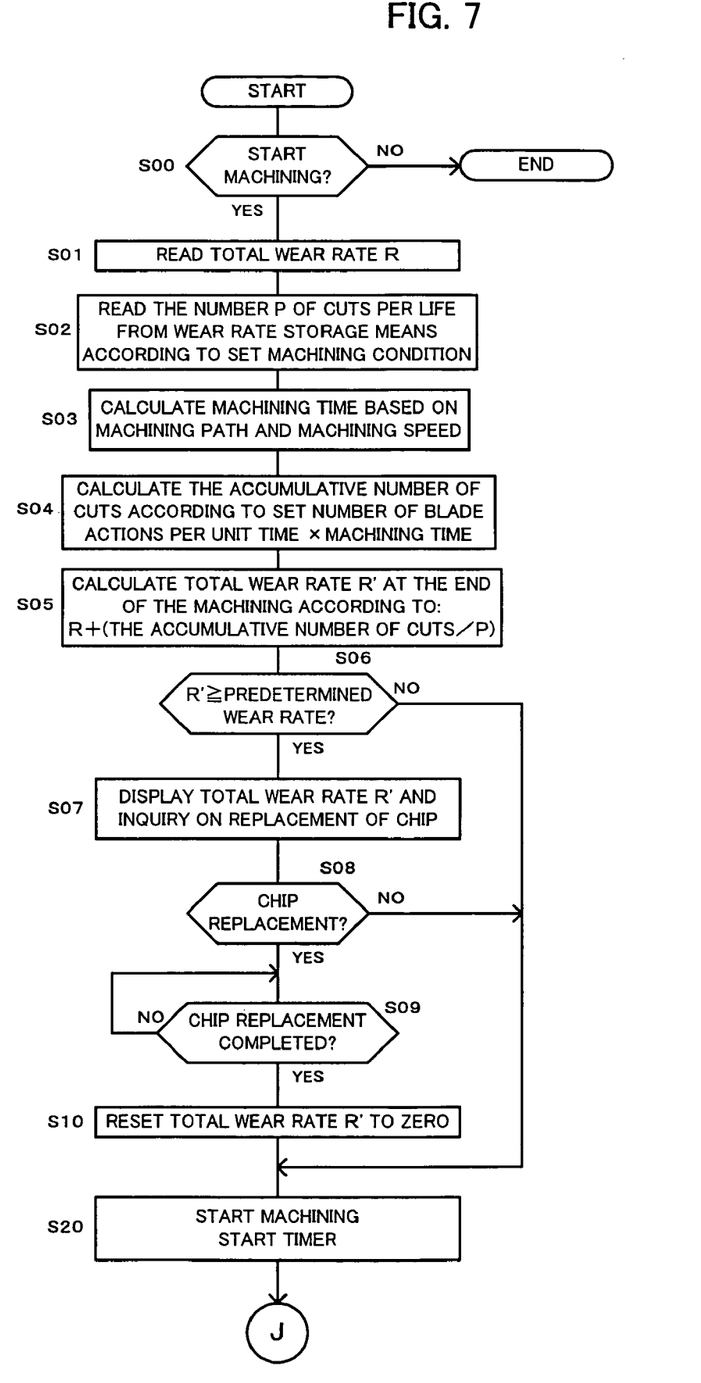
FIG. 7 is a flow chart showing a part of a process performed by a processor in first and second embodiments of the present invention.
Figure 8:
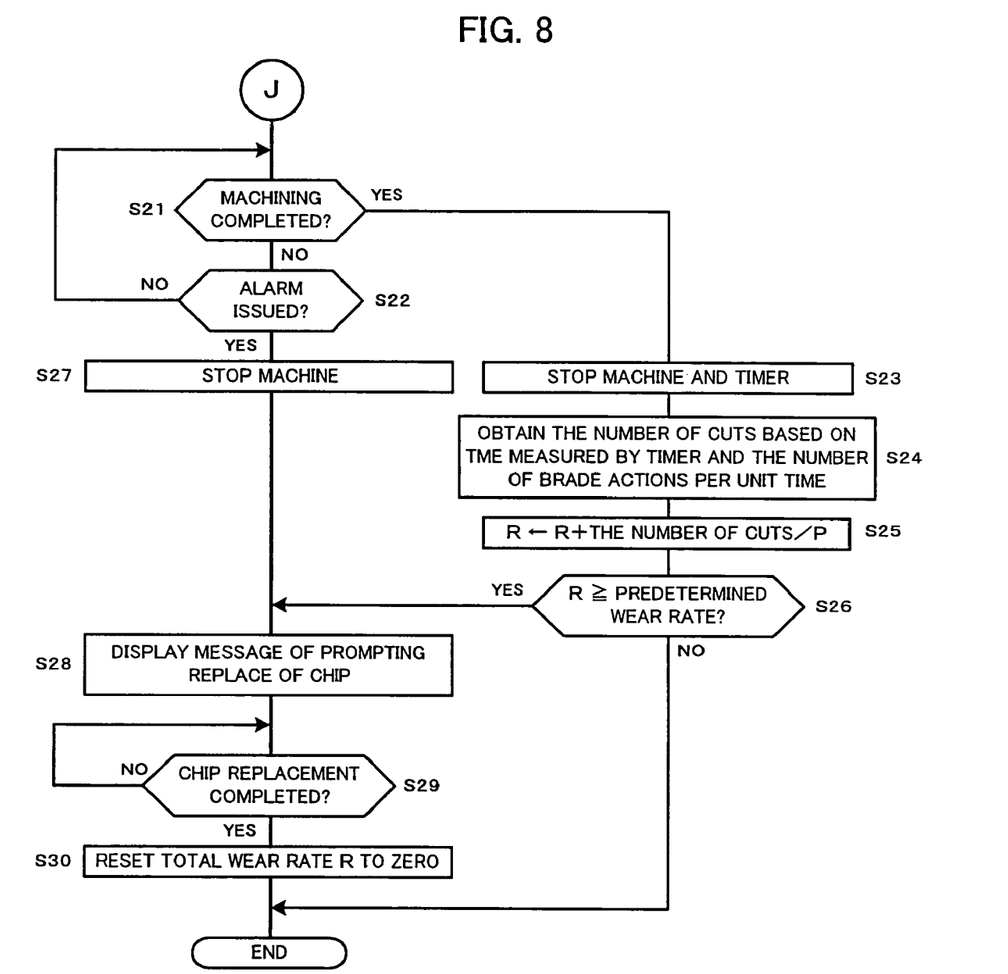
FIG. 8 is a flow chart showing a part of the process performed following the part shown in FIG. 7 in the first embodiment of the present invention.

FIGS. 7 and 8 are flow charts showing the process performed by the processor 11 (hereinafter referred to as "CPU") in the first embodiment of the invention. The CPU actually starts performing this process with a workpiece machining start instruction (Step S00). First, in advance of starting actual machining, the CPU estimates the wear rate of the blade. Specifically, first, the CPU reads the total wear rate of the blade at present (namely, before starting machining) R stored in the memory 12 (Step S01). Then, on the basis of machining conditions set for a wire used, namely the diameter and material of the wire, the CPU reads the number of cuts per life P from the wear rate storage means (see FIG. 6) (Step S02). Then, on the basis of machining conditions about a workpiece, namely the path of machining and the speed of feeding for machining, the CPU calculates the time of machining (Step S03). Then, according to the equation set forth in the section headed "1-3-3 Estimating the time to replace the blade in advance of starting machining", the CPU calculates the number of cuts by multiplying the set value for the number of blade actions per unit time by the time of machining (Step S04). Then, from the total wear rate of the blade at present R stored in the memory 12, the number of cuts and the wear rate 1/P, the CPU calculates the total wear rate at the end of machining (estimated value) R' (Step S05). Then, the CPU determines whether or not the total wear rate at the end of machining thus calculated (estimated value) R' reaches the predetermined wear rate (Step S06).

If the calculated value R' for the total wear rate at the end of machining does not reach the predetermined wear rate, the CPU determines that it is false in Step S06, and jumps to Step S20 to start machining. If the calculated value R' for the total wear rate at the end of machining reaches the predetermined wear rate, it means that the time to replace the blade will come during electric discharge machining. Hence, in order to recommend the operator to replace the blade, the CPU displays the calculated value R' for the total wear rate at the end of machining and an inquiry asking whether or not the operator will replace the chip on the display screen (Step S07), and waits for the operator to enter "YES" or "NO" (Step S08). If "NO" is entered in Step S08, the chip is not replaced and the CPU jumps to the Step S20 to start machining. If "YES" is entered in Step S08, the chip is replaced manually, and the CPU displays, for confirmation, a question asking whether or not the chip replacement has been completed, on the display screen and waits until "YES" is entered (Step S09). When the operator enters "YES" in Step S09, the CPU resets the total wear rate at present R to 0 (Step S10), and proceeds to Step S20 to start machining and reset and start a timer for measuring the time of machining.

It can be so arranged that, instead of Steps S06 and S07, the CPU only displays the estimated value R' for the total wear rate obtained in Step S05, on the display screen to make the operator decide whether to replace the chip or not.

As stated above, in advance of staring machining, the total wear rate at the end of machining is estimated. If the estimated value for the total wear rate at the end of machining is equal to or greater than the predetermined wear rate, it means that the time to replace the blade will come during electric discharge machining. Hence, a message indicating that the time to replace the blade will come is displayed to recommend replacing the blade. Thus, trouble such that a used wire is not cut during machining can be avoided.

Next, steps after starting actual machining, namely during actual machining will be described. Following Step S20, the CPU determines whether or not the actual machining has completed or not (Step S21), and whether or not an alarm indicating wire cut failure has issued (Step S22). If the actual machining has ended, the CPU stops the machine and also stops the timer's action of measuring time (Step S23), and obtains the number of cuts performed on the wire during machining by multiplying the time measured by the timer by the set value for the number of cuts (actions of cutting) per unit time (Step S24). Then, the CPU reads the number of cuts per life P for the wire used (wire identified by its diameter and material), stored in the wear rate storage means provided in the memory 12, and obtains the total wear rate at the end of machining R by dividing the number of cuts performed on this wire by the number of cuts per life P (multiplying the number of cuts by the wear rate 1/P) and adding the resultant value to the total wear rate R stored (Step S25). Then, the CPU determines whether the total wear rate at present R thus obtained reaches the predetermined wear rate or not (Step S26). If the total wear rate at present R does not reach the predetermined wear rate, the CPU ends the current process.

If the total wear rate R reaches the predetermined wear rate, the CPU determines that it is true in Step S26, and proceeds to Step S28 to display a message prompting the operator to replace the chip (blade), on the display screen of the display/manual input unit 13.

When the operator replaces the chip and enters the information that the chip replacement has been completed (Step S29), the CPU resets the total wear rate R to 0 (Step S30) and ends the current process.

If the CPU detects an alarm indicating wire cut failure in Step S22, the CPU stops the machine and proceeds to Step S28 to make the operator replace the chip and reset the total wear rate R to 0.

In the first embodiment described above, the number of cuts per life (wear rate) stored in the wear rate storage means provided in the memory 12 is fixed and not changed. However, there are cases in which it is better to change it depending on the type of the chip, the maker of the wire, and others. Hence, an embodiment so arranged that the number of cuts per life (wear rate) stored in the wear rate storage means can be changed will be described as a second embodiment.

First, how to change the number of cuts per life stored in the wear rate storage means shown in FIG. 6, on the basis of data obtained by actual cutting will be described. When the time for replacement recognized while cutting is actually performed is different from the time for replacement estimated (for example, the life of the blade expires before the time estimated, or the blade proves to be still functional when used beyond the time estimated), the reliability of the time for replacement estimated can be improved by correcting the number of cuts per life stored.

Using examples, how to correct the number of cuts per life will described below. First, as a step common to all examples, the total wear rate of the blade at the time of blade replacement is obtained by continuing to add wear rates until the blade is actually replaced.

2-1: When One Type of Wire was Used before the Blade was Replaced

When one type of wire (of the same diameter and the same material) was used before the blade was replaced, the number of cuts per life stored is corrected on the basis of the total wear rate at the time of blade replacement, obtained by adding wear rates until the blade was replaced.

EXAMPLE 2-1-A

Suppose that for the wire of φ 0.3 and material A, the life of the blade actually expired when 1500 cuts were performed, although the number of cuts per life (P51) is 1000. Since the total wear rate at the time of blade replacement obtained by adding wear rates is 1.5 (the ratio of the total wear rate to the predetermined wear rate is 1.5), the number of cuts per life (P51) is corrected from 1000 to 1500 (=1000×1.5). Here, the numbers of cuts per life for wires that are the same in material and different in diameter from the wire used may be corrected together. It is desirable that such correction be likewise made on the basis of the total wear rate.

EXAMPLE 2-1-B

When the number of cuts per life (P51) for the wire of φ 0.3 and material A is corrected from 1000 to 1500 like in (example 2-1-A) above, the numbers of cuts per life for wires that are the same in material (material A) and different in diameter may be corrected at the same rate of correction. Specifically, correction may be made as below:

the number of cuts per life (P11) for the wire of φ 0.1 and material A: 3000→4500 the number of cuts per life (P21) for the wire of 0.15 and material A: 2500→3750 the number of cuts per life (P31) for the wire of 0.2 and material A: 2000→3000 the number of cuts per life (P41) for the wire of 0.25 and material A: from 1500→2250

2-2: When Two or More Types of Wires were used before the Blade was Replaced 2-2-1. Correction to the Number of Cuts per Life Depending on the Diameter and Material of the Wire (Uniform Correction)

Also when two or more types of wires (different in diameter or material) were used before the blade was replaced, the number of cuts per life stored is corrected on the basis of the ratio of the total wear rate at the time of blade replacement to the predetermined wear rate, like in the case 2-1 above.

EXAMPLE 2-2-1

Suppose that the wire of φ 0.3 and material A, the wire of φ 0.2 and material A, and the wire of φ 0.3 and material B were used before the blade was replaced, and that the total wear rate at the time of blade replacement obtained by adding wear rates was 1.2. On the basis of the ratio (total wear rate/predetermined wear rate=1.2/1), correction is made as below:

the number of cuts per life (P51) for the wire of φ 0.3 and material A: 1000→1200 the number of cuts per life (P31) for the wire of φ 0.2 and material A: 2000→2400 the number of cuts per life (P52) for the wire of φ 0.3 and material B: 1500→1800

Also in this case, the numbers of cuts per life for wires of material A and a different diameter (P11, P21, P41) and for wires of material B and a different diameter (P12, P22, P32, P42) may be corrected, like in (example 2-1-B) above.

2-2-2. Correction to the Number of Cuts per Life Depending on the Diameter and Material of the Wire (Some Values are not Corrected)

When two or more types of wires were used before the blade was replaced, it may be thought that those wires for which the accumulated wear rate obtained by adding wear rates for each type of wire (wire of the same diameter and the same material) was low did not contribute to producing a difference between the total wear rate obtained by adding wear rates and the actual total wear rate. For those wires, the number of cuts per life does not need to be corrected.

EXAMPLE 2-2-2

Suppose that before the blade was replaced, the wire of φ 0.3 and material A, for which the number of cuts per life (P51) is 1000, the wire of φ 0.2 and material A, for which the number of cuts per life (P31) is 2000, and the wire of φ 0.3 and material B, for which the number of cuts per life (P52) is 1500 were used, and that 100 cuts were performed on the wire of φ 0.3 and material A (the accumulated wear rate: 0.1), 1200 cuts were performed on the wire of φ 0.2 and material A (the accumulated wear rate: 0.6), and 750 cuts were performed on the wire of φ 0.3 and material B (the accumulated wear rate: 0.5).

the total wear rate (sum of the accumulated wear rates): 1.2

In this case, assuming that the wire of φ 0.3 and material A did not contribute to producing a difference between the total wear rate calculated and the actual total wear rate, only the number of cuts per life (P31) for the wire of φ 0.2 and material A and the number of cuts per life (P52) for the wire of φ 0.3 and material B are corrected.

For example, assuming that the wire of φ 0.2 and material A and the wire of φ 0.3 and material B contributed to producing the difference between the total wear rate calculated and the actual total wear rate to the same degree, the same numerical value is multiplied with the accumulated wear rate for the wire of φ 0.2 and material A and the accumulated wear rate for the wire of φ 0.3 and material B so that the sum of the accumulated wear rates is 1.0. Thus, X satisfying the equation:

$$0.1+(X\times 0.6)+(X\times 0.5)=1.0$$

is obtained. Since X=0.818, the accumulated wear rate for each wire is corrected as below:

for the wire of φ 0.3 and material A, the accumulated wear rate corrected: 0.1 (not changed)

for the wire of φ 0.2 and material A, the accumulated wear rate corrected: 0.49 (=0.6×0.818)

for the wire of φ 0.3 and material B, the accumulated wear rate corrected: 0.41 (=0.5×0.818)

the sum of the accumulated wear rates corrected (total wear rate): 1.0

On the basis of the accumulated wear rates corrected, new values for the number of cuts per life are obtained to replace the old ones, as below:

for the wire of φ 0.3 and material A, the number of cuts per life (P51): 1000 (not changed)

for the wire of φ 0.2 and material A, the number of cuts per life (P31): 2444(=1200/0.49)

for the wire of φ 0.3 and material B, the number of cuts per life (P52): 1833(=750/0.41)

2-2-3. Correction to the Number of Cuts per Life Depending on the Diameter and Material of the Wire (Non-Uniform Correction)

When two or more types of wires were used before the blade was replaced, the numbers of cuts per life can be corrected at a rate of correction that depends on the diameter and material of the wire, instead of correcting them uniformly on the basis of the total wear rate.

EXAMPLE 2-2-3-A)

Suppose that before the blade was replaced,
the wire of φ 0.3 and material A, for which the number of cuts per life (P51) is 1000,
the wire of φ 0.2 and material A, for which the number of cuts per life (P31) is 2000, and
the wire of φ 0.3 and material B, for which the number of cuts per life (P52) is 1500
were used, and that
300 cuts were performed on the wire of φ 0.3 and material A (the accumulated wear rate: 0.3),
1000 cuts were performed on the wire of φ 0.2 and material A (the accumulated wear rate: 0.5), and
600 cuts were performed on the wire of φ 0.3 and material B (the accumulated wear rate: 0.4).
the total wear rate (sum of the accumulated wear rates: 1.2
Here, suppose that, from experience or the like, it is known that the difference between the accumulated wear rate obtained by adding wear rates and the actual wear rate is greater for material B than for material A, and that the value of (accumulated wear rate obtained−accumulated wear rate corrected)/accumulated wear rate obtained is twice greater for material B than for material A. When X, Y and Z denotes the corrected values for the accumulated wear rate for the wire of φ 0.3 and material A, the wire of φ 0.2 and material A and the wire of φ 0.3 and material B, respectively, $X+Y+Z=1.0$ $2\times(0.3-X)/0.3=2\times(0.5-Y)/0.5=(0.4-Z)/0.4$ Solving these simultaneous equations gives X=0.2625, Y=0.4375 and Z=0.3. Hence, the accumulated wear rate for each wire is corrected as below:
for the wire of φ 0.3 and material A, the accumulated wear rate corrected: 0.2625
for the wire of φ 0.3 and material A, the accumulated wear rate corrected: 0.4375
for the wire of φ 0.3 and material B, the accumulated wear rate corrected: 0.3
the sum of the accumulated wear rates corrected: 1.0
On the basis of the accumulated wear rates corrected, new values for the number of cuts per life are obtained to replace the old ones, as below:
for the wire of φ 0.3 and material A, the number of cuts per life (P51): 1143(=300/0.2625)
for the wire of φ 0.2 and material A, the number of cuts per life (P31): 2286(=1000/0.4375)
for the wire of φ 0.3 and material B, the number of cuts per life (P52): 2000(=600/0.3)
Also in this case, the numbers of cuts per life for wires of material A and a different diameter (P11, P21, P41) and for wires of material B and a different diameter (P12, P22, P32, P42) may be corrected, as in (example 2-1-B) above.
In example 2-2-3-A, the numbers of cuts per life for the wires of material A (P31, P51) are corrected to 1.143 times the original values, and the number of cuts per life for the wire of material B (P52) is corrected to 1.333 times the original value. Hence, the numbers of cuts per life for other wires of material A (P11, P21, P41) are corrected to 1.143 times the original values, and the numbers of cuts per life for other wires of material B (P12, P22, P32, P42) are corrected to 1.333 times the original values. Although in example (2-2-3-A) above, the correction to the wear rate is automatically performed, it may be performed by the operator.

EXAMPLE 2-2-3-B

Suppose that before the blade was replaced,
the wire of φ 0.3 and material A, for which the number of cuts per life (P51) is 1000,
the wire of φ 0.2 and material A, for which the number of cuts per life (P31) is 2000, and
the wire of φ 0.3 and material B, for which the number of cuts per life (P52) is 1500
were used, and that
300 cuts were performed on the wire of φ 0.3 and material A (the accumulated wear rate: 0.3)
1000 cuts were performed on the wire of φ 0.2 and material A (the accumulated wear rate: 0.5), and
600 cuts were performed on the wire of φ 0.3 and material B (the accumulated wear rate: 0.4).
the total wear rate (sum of the accumulated wear rates): 1.2
Here, in order that the total wear rate is 1, the accumulated wear rates are corrected, for example as below:
for the wire of φ 0.3 and material A, the accumulated wear rate corrected: 0.25
for the wire of φ 0.2 and material A, the accumulated wear rate corrected: 0.45
for the wire of φ 0.3 and material B, the accumulated wear rate corrected: 0.3
the total wear rate corrected (sum of the accumulated wear rates corrected): 1.0
On the basis of the accumulated wear rates corrected, new values for the number of cuts per life are obtained to replace the old ones, as below:
for the wire of φ 0.3 and material A, the number of cuts per life (P51): 1200(=300/0.25)
for the wire of φ 0.2 and material A, the number of cuts per life (P31): 2222(=1000/0.45)
for the wire of φ 0.3 and material B, the number of cuts per life (P52): 2000(=600/0.3)
Also in this case, the numbers of cuts per life for wires of material A and a different diameter (P11, P21, P41) and for wires of material B and a different diameter (P12, P22, P32, P42) may be corrected, as in (example 2-1-B) above.
In (example 2-2-3-B), the number of cuts per life for the wire of φ 0.3 and material A (P51) is corrected to 1.2 times the original value, and the number of cuts per life for the wire of φ 0.2 and material A (P31) is corrected to 1.11 times the original value. Hence the numbers of cuts per life for wires of material A and a different diameter (P11, P21, P41) are corrected to 1.2 times the original values or 1.11 times the original values. Correction may be made such that whether the number of cuts per life is corrected to 1.2 times the original value or 1.11 times the original value depends on the diameter of the wire. Since the number of cuts per life for the wire of φ 0.3 and material B (P52) is corrected to 1.333 times the original value, the numbers of cuts per life for wires of material B and a different diameter (P12, P22, P32, P42) are corrected to 1.333 times the original values.

In the above, it has been pointed out that when the number of cuts per life depending on the diameter and material of the wire is corrected, values for wires of the same material and a different diameter may be corrected together. However, correction does not need to be limited to such values. Values for the number of cuts per life for another material may be corrected together. For example, when the values for the number of cuts per life for material B are corrected, the values for material A may be corrected together.

Further, when the number of cuts per life is corrected, values for the number of cuts per life for the same diameter and a different material may be corrected together. For example, when the value for the number of cuts per life for φ 0.3 and material A is corrected, the value for φ 0.3 and material B and the value for φ 0.3 and material C may be corrected together.

Further, when the number of cuts per life depending on the diameter and material of the wire is corrected, the values for the number of cuts per life for all the diameters and all the materials may be corrected together. The present invention is applicable to rotary blades, reciprocatory blades and others, regardless of the shape of blades.

A second embodiment to which the above-described way of correcting the number of cuts per life stored in the wear rate storage means on the basis of data obtained by actual cutting will be described below. In the second embodiment, for use in correcting the number of cuts per life stored in the wear rate storage means, a chip use history storing section for storing the history of cuts performed by a chip (blade) is provided in the memory 12. The description of Steps S00 to S20 shown in FIG. 7 will be omitted, since the second embodiment is the same as the first embodiment regarding these steps.

Figure 9:
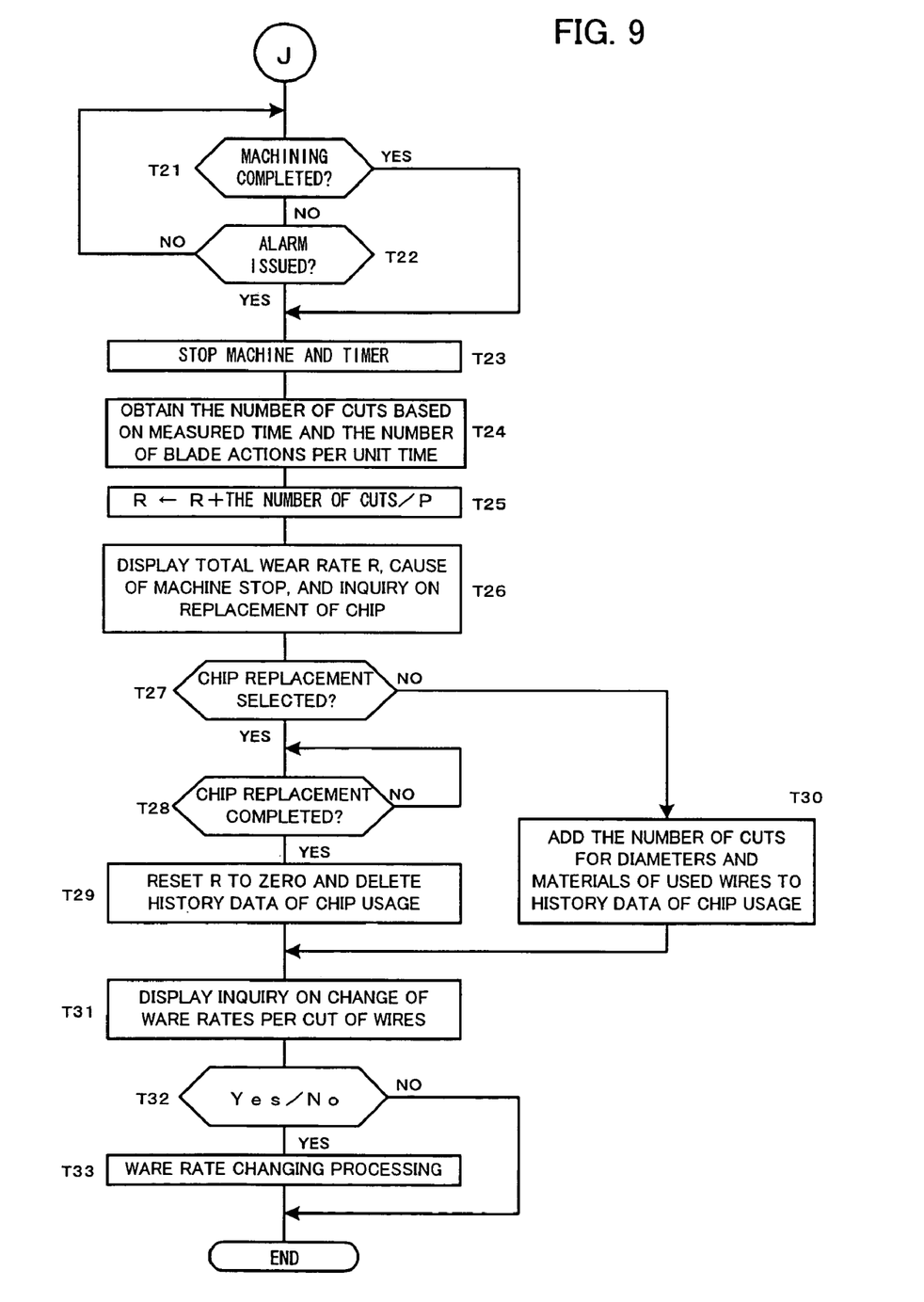
FIG. 9 is a flow chart showing a part of the process performed following the part shown in FIG. 7 in the second embodiment of the present invention.

After performing Steps S00 to S20 shown in FIG. 7, the processing proceeds to Step T21 to determine whether or not machining has completed (Step T21), and whether or not an alarm indicating wire cut failure has issued (Step T22). If the machining has ended or an alarm indicating wire cut failure is detected, the CPU stops the machine and also stops the timer's action of measuring time (Step T23). Then, the CPU obtains the number of cuts during machining by multiplying the time measured by the timer by the set value for the number of cuts (actions of cutting) per unit time (Step T24). The CPU reads the number of cuts per life P for the wire used (wire identified by its diameter and material), stored in the wear rate storage means provided in the memory 12, and obtains the total wear rate at the end of machining R by dividing the number of cuts performed on the wire obtained above, by the number of cuts per life P (multiplying the number of cuts performed on the wire by the wear rate 1/P) and adding the resultant value to the total wear rate R stored (Step S25).

The CPU displays the total wear rate R thus calculated and a cause of machine stoppage, namely whether the machine has been stopped because the machining has completed or because of wire cut failure, on the display screen of the display/manual input unit 13, and also displays an inquiry asking whether the operator will replace the chip or not (Step T26)

When the operator ascertains, from the data displayed, that the machine has been stopped because the machining has ended, and that the total wear rate R is low so that the chip is still usable, the operator enters a chip non-replacement instruction (NO). When the machine has been stopped because of wire cut failure or when the operator determines that it is better to replace the chip because the total wear rate R is close to the predetermined wear rate or exceeds it, the operator enters a chip replacement instruction (YES). The CPU 11 determines whether the chip replacement instruction (YES) has been entered or not (Step T27). If the chip non-replacement instruction has been entered, the CPU additionally stores the number of cuts obtained in Step T24, in a manner connected to the diameter and material of the wire used, in the chip use history storing section provided in the memory 12 (Step T30), and proceeds to Step T31.

When the operator enters the chip replacement instruction, replaces the chip and enters information that the chip replacement has been completed (Step T28), the CPU 11 resets the total wear rate R to 0, deletes the data stored in the chip use history storing section (Step T29), and proceeds to Step T31. The last value of the total wear rate R, namely the value before the total wear rate R is reset to 0 stays displayed and is stored in a register, since it will be used in changing the wear out rate as mentioned below. In Step T31, the CPU displays a question asking whether to change the wear rate (number of cuts) stored in the wear rate storage means. If the operator decides not to change the wear rate and enters a corresponding instruction (NO) (Step T32), the CPU ends the current process. If the operator enters a wear-rate change instruction (Step T32), the CPU changes the wear rate on the basis of the data stored in the chip use history storing section, according to any of the ways of changing the wear rate described in the sections headed "2-1: When one type of wire was used before the blade was replaced" and "2-2 When two or more types of wires were used before the blade was replaced" (Step T33).

Here, as stated above, only the wear rate (number of cuts) for the diameter and material of the wire used may be changed, or the wear rates (numbers of cuts) for the same material as that of the wire used may be changed. Alternatively, also the wear rates (numbers of cuts) for diameters and materials different from the diameter and material of the wire used may be changed. Alternatively, it may be so arranged that the CPU displays, on the display screen, a screen display for the operator to select the range of change to the wear rate (number of cuts) (only a value for the diameter and material of the wire used, only values for the material of the wire used, all the values), makes the operator select the range of change, and changes the wear rate in the range selected.

In the second embodiment described above, the processing proceeds form Step T30 to Step T31. However, it may be assumed that the wear rate is mostly not changed when the chip is not replaced. Hence, it may be so arranged that the CPU terminates the current process immediately after Step T30.

What is claimed is:

1. A used wire cutting device for repeatedly cutting a used wire by a blade in a wire-cut electric discharge machine, comprising:
   wear rate storage means storing information on a predetermined wear rate of the blade per cut of the wire;
   counting means for counting the number of cuts of the wire by the blade;
   blade replace time determining means for determining time to replace the blade based on the wear rate of the blade per cut of the wire and the number of cuts of the wire by the blade and to output a signal indicative of the time to replace the blade; and
   blade replacing means for replacing the blade in response to the signal to replace the blade,
   wherein said wear rate storage means stores information on predetermined wear rates of the blade per cut of wires having different diameters.

2. A used wire cutting device according to claim 1, wherein said wear rate storage means stores the number of cuts performable by the blade in a life thereof, based on which the predetermined wear rate of the blade per cut of the wire is obtained.

3. A used wire cutting device according to claim 1, wherein said counting means counts the number of cuts of the wire by the blade based on the number of actions of the blade per unit time and a time period in which the blade is in operation.

4. A used wire cutting device according to claim 1, wherein said blade replace time determining means obtains a total wear rate of the blade based on the predetermined wear rate of the blade per cut of the wire and the number of cuts of the wire by the blade, and determines that it is time to replace the blade when the obtained total wear rate is equal to or greater than a predetermined value.

5. A used wire cutting device according to claim 1, wherein said blade replace time determining means includes means for estimating the number of cuts of the wire by the blade during an electric discharge machining based on a machining program before starting the electric discharge machining, means for estimating an accumulative wear rate of the blade based on the predetermined wear rate of the blade per cut and the estimated number of cuts, and means for estimating a total wear rate after the electric discharge machining by adding the estimated accumulative wear rate to a total wear rate of the blade before the electric discharge machining, and means for determining whether or not the time to replace the blade comes before finishing the electric discharge machining based on the estimated total wear rate after the electric discharge machining.

6. A used wire cutting device according to claim 1, wherein the blade includes a movable blade using a throw-away chip and a stationary blade.

7. A used wire cutting device according to claim 1, wherein the blade includes a movable blade and a stationary blade each having at least two portions usable by changing a position thereof.

8. A used wire cutting device for repeatedly cutting a used wire by a blade in a wire-cut electric discharge machine, comprising:
   wear rate storage means storing information on a predetermined wear rate of the blade per cut of the wire;
   counting means for counting the number of cuts of the wire by the blade; and
   blade replace time determining means for determining time to replace the blade based on the wear rate of the blade per cut of the wire and the number of cuts of the wire by the blade and to output a signal indicative of the time to replace the blade; and
   blade replacing means for replacing the blade in response to the signal to replace the blade,
   wherein said wear rate storage means stores information on predetermined wear rates of the blade per cut of wires having different materials.

9. A used wire cutting device for repeatedly cutting a used wire by a blade in a wire-cut electric discharge machine, comprising:
   wear rate storage means storing information on a predetermined wear rate of the blade per cut of the wire;
   counting means for counting the number of cuts of the wire by the blade; and
   blade replace time determining means for determining time to replace the blade based on the wear rate of the blade per cut of the wire and the number of cuts of the wire by the blade and to output a signal indicative of the time to replace the blade;
   blade replacing means for replacing the blade in response to the signal to replace the blade; and
   correcting means for correcting the information on the predetermined wear rate of the blade per cut of the wire stored in said wear rate storage means based on the counted number of cuts of the wire when the blade is replaced.

10. A used wire cutting device for repeatedly cutting a used wire by a blade in a wire-cut electric discharge machine, comprising:
    wear rate storage means storing information on a predetermined wear rate of the blade per cut of the wire;
    counting means for counting the number of cuts of the wire by the blade; and
    blade replace time determining means for determining time to replace the blade based on the wear rate of the blade per cut of the wire and the number of cuts of the wire by the blade and to output a signal indicative of the time to replace the blade; and
    blade replacing means for replacing the blade in response to the signal to replace the blade; and
    correcting means for correcting the information on the predetermined wear rate of the blade per cut of the wire stored in said wear rate storage means based on a total wear rate of the blade when the blade is replaced.

11. A used wire cutting device according to claim 10, wherein the predetermined wear rate of the blade per cut of the wire is corrected in accordance with a ratio between the total wear rate of the blade when the blade is replaced and the predetermined wear rate.

12. A used wire cutting device according to claim 10, wherein the predetermined wear rates of the blade per cut of wires of diameters and materials which the blade cut are corrected in accordance with a ratio between the total wear rate of the blade when the blade is replaced and the predetermined wear rates.

13. A used wire cutting device according to claim 10, wherein the predetermined wear rates of the blade per cut of wires of materials which the blade cut before changing the blade are corrected in accordance with a ratio of the total wear rate of the blade when the blade is replaced and the predetermined wear rates.

14. A method of cutting a used wire by a blade in a wire-cut electric discharge machine, comprising:
    storing information on a predetermined wear rate of the blade per cut of the wire;
    counting the number of cuts of the wire by the blade;
    determining a time to replace the blade based on the wear rate of the blade per cut of the wire and the number of cuts of the wire by the blade;
    outputting a signal indicative of the time to replace the blade; and
    replacing the blade in response to the signal to replace the blade,
    wherein the storing information on a predetermined wear rate of the blade per cut of the wire stores information on predetermined wear rates of the blade per cut of wires having different diameters.

15. A computer readable medium having instructions for causing a computer to execute a method of cutting a used wire by a blade in a wire-cut electric discharge machine, comprising:

storing information on a predetermined wear rate of the blade per cut of the wire;

counting the number of cuts of the wire by the blade;

determining a time to replace the blade based on the wear rate of the blade per cut of the wire and the number of cuts of the wire by the blade;

outputting a signal indicative of the time to replace the blade;

replacing the blade in response to the signal to replace the blade; and correcting the information on the predetermined wear rate of the blade per cut of the wire based on the counted number of cuts of the wire when the blade is replaced.

* * * * *

UNITED STATES PATENT AND TRADEMARK OFFICE
CERTIFICATE OF CORRECTION

PATENT NO. : 7,130,713 B2
APPLICATION NO. : 11/136411
DATED : October 31, 2006
INVENTOR(S) : Yuki Kita et al.

It is certified that error appears in the above-identified patent and that said Letters Patent is hereby corrected as shown below:

In the Drawings:

Fig. 1, above "FIG. 1" insert --PRIOR ART--
    Fig. 8, (box S24), change "TME" to --TIME--

In the Specification:

Col. 9, line 26, change "0.15" to --Φ0.15--

Col. 9, line 28, change "0.2" to --Φ0.2--

Col. 9, line 30, change "0.25" to --Φ0.25--

Col. 10, line 25, change "the" (first occurrence) to --The--

Col. 10, line 26, after "1.2", insert --.--

Col. 10, line 54, after "1.0", insert --.--

Col. 11, line 7, change "EXAMPLE 2-2-3-A)" to --(EXAMPLE 2-2-3-A)--

Col. 11, line 23, change "the" (first occurrence) to --The--

Col. 11, line 23, change "rates:" to --rates):--

Col. 11, line 23, after "1.2", insert --.--

Col. 11, line 50, after "1.0", insert --.--

Col. 12, line 27, change "the" (first occurrence) to --The--

Col. 12, line 28, after "1.2", insert --.--

Col. 12, line 38 (approx.) after "1.0", insert --.--

UNITED STATES PATENT AND TRADEMARK OFFICE
CERTIFICATE OF CORRECTION

PATENT NO. : 7,130,713 B2
APPLICATION NO. : 11/136411
DATED : October 31, 2006
INVENTOR(S) : Yuki Kita et al.

It is certified that error appears in the above-identified patent and that said Letters Patent is hereby corrected as shown below:

In the Specification (cont'd):

Col. 13, line 59, after "T26)" insert --.--

Signed and Sealed this

Seventeenth Day of July, 2007

JON W. DUDAS
*Director of the United States Patent and Trademark Office*